C. W. BEAM.
TRUING DEVICE FOR GRINDING MACHINES.
APPLICATION FILED OCT. 9, 1911.

1,089,455.

Patented Mar. 10, 1914.
3 SHEETS—SHEET 1.

WITNESSES:
J. Herbert Bradley.
Francis J. Tomasson.

INVENTOR
Charles W. Beam
by Christy and Christy
Atty's

C. W. BEAM.
TRUING DEVICE FOR GRINDING MACHINES.
APPLICATION FILED OCT. 9, 1911.

1,089,455.

Patented Mar. 10, 1914.
3 SHEETS—SHEET 3.

UNITED STATES PATENT OFFICE.

CHARLES W. BEAM, OF ROCHESTER, PENNSYLVANIA, ASSIGNOR TO H. C. FRY GLASS COMPANY, OF ROCHESTER, PENNSYLVANIA, A CORPORATION OF PENNSYLVANIA.

TRUING DEVICE FOR GRINDING-MACHINES.

1,089,455.  Specification of Letters Patent.  Patented Mar. 10, 1914.

Application filed October 9, 1911. Serial No. 653,664.

*To all whom it may concern:*

Be it known that I, CHARLES W. BEAM, residing at Rochester, in the county of Beaver and State of Pennsylvania, a citizen of the United States, have invented or discovered certain new and useful Improvements in Truing Devices for Grinding-Machines, of which improvements the following is a specification.

My invention relates to improvements in grinding machines which employ rotary grindstones, and my improvement has particularly to do with a device forming part of such a machine or attachable to such a machine for truing or shaping the grinding face of the grindstone and keeping the face in true shape as the stone wears away in service.

While not limited in its service to use with grindstones of any particular shape or of any particular material or quality or for any particular kind of service, I have found my invention useful in connection with stones of relatively fine texture used in grinding the surface of articles of glassware, and particularly in connection with stones having grinding surfaces which are not symmetrical.

I shall describe my invention as it is used in a machine of the nature indicated, but it will be understood that the essential features of the invention may be employed in machines used in connection with grindstones of other material, of other quality and of other shape and adapted for other uses.

Figure 1:
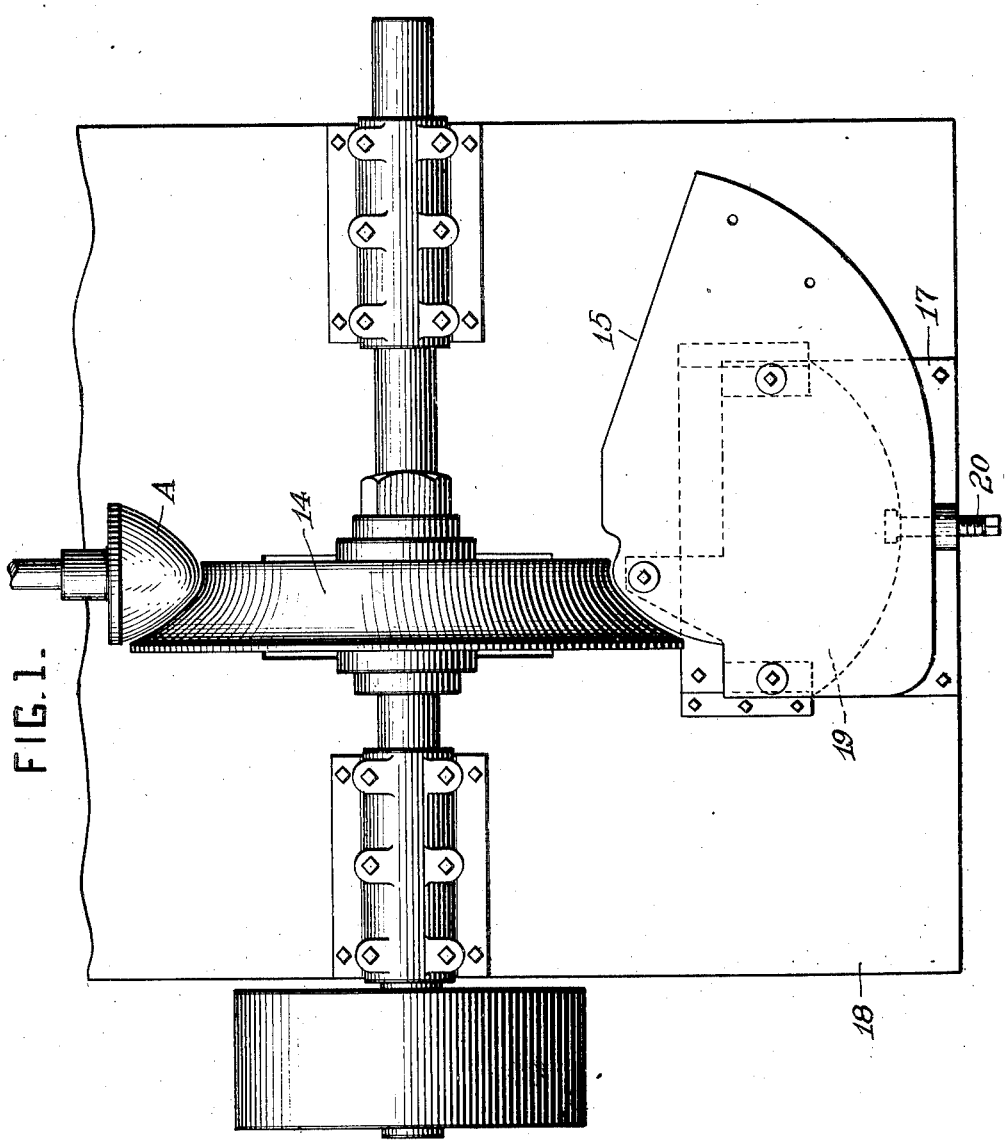
Figure 2:
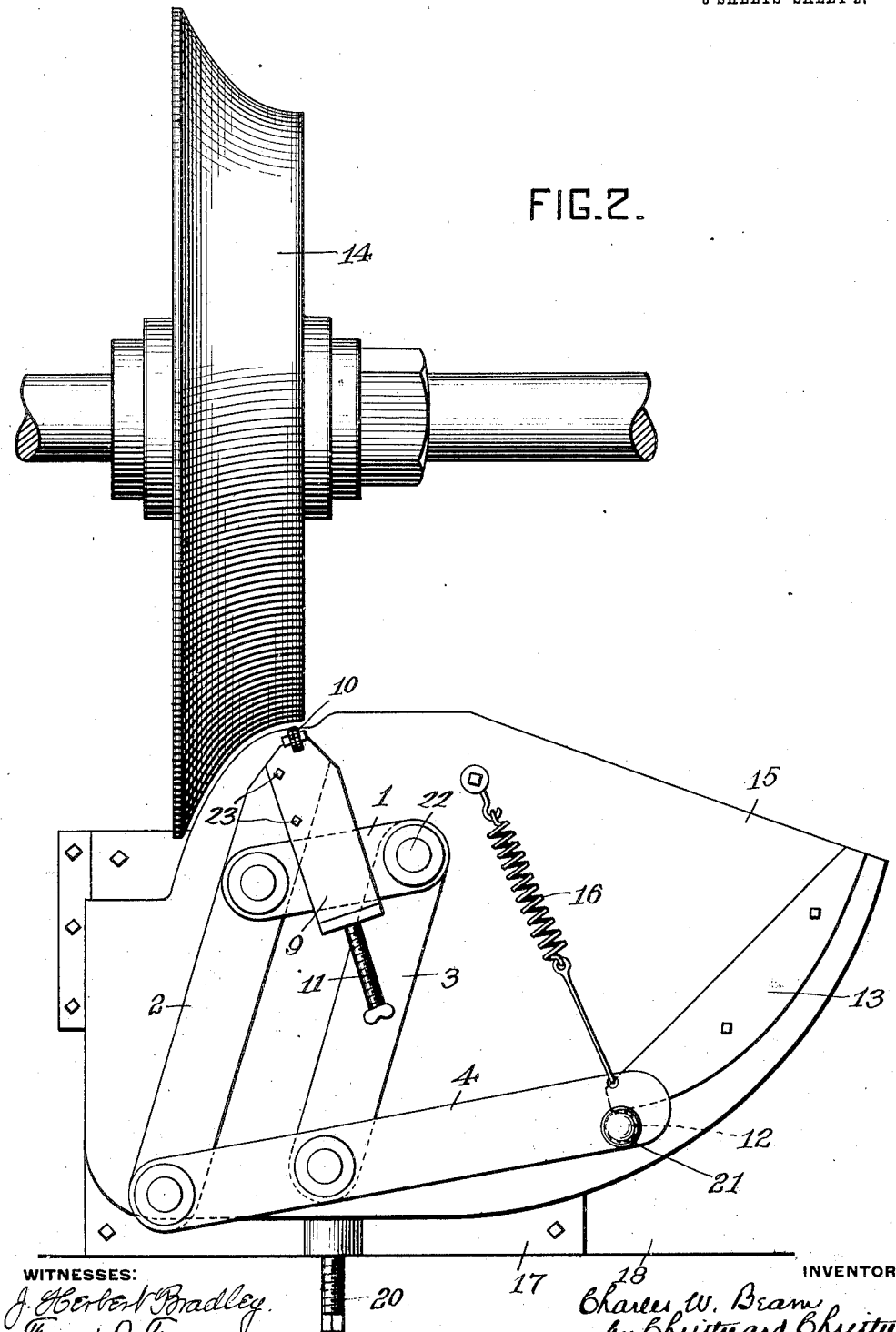
Figure 3:
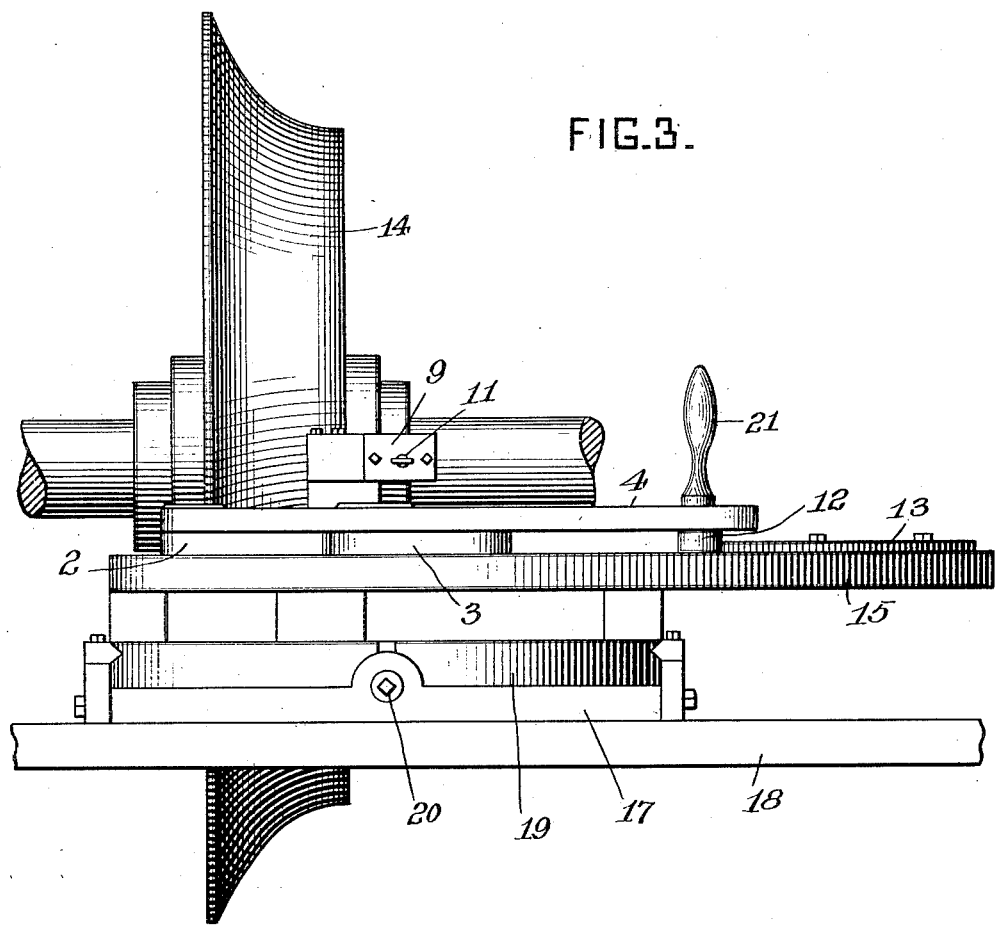

In the accompanying drawings which form part of this specification Figure 1 is a plan view of the essential parts of a machine for grinding the exterior surfaces of parabolic glass mirrors with the device in which my invention resides applied thereto. In this figure a portion of the shaping or truing device has been removed, in order that the remaining portions may be more clearly illustrated. Fig. 2 is a like view on larger scale, showing a portion of the machine shown in Fig. 1, and in this figure the portions of the grinding and truing device omitted from Fig. 1 are present. Fig. 3 is a side elevation of the machine so far as it is shown in Fig. 2. In the three figures like numerals indicate like parts.

The essential feature of the grinding machine is the grindstone 14, and, as shown, the grinding face of this stone is laterally unsymmetrical and is of parabolic contour. Fig. 1 shows the grindstone mounted for rotation in ordinary and familiar manner. In this same figure a glass blank A for a parabolic mirror is shown, carried by a suitable support or carrier, upon which it is held adjacent to and in operative relation to the grindstone 14, to the end that the outer surface of the blank A may be ground by the grindstone to the desired shape or configuration. While this detail is not shown, it will be understood that the carrier which supports the blank A rotates upon its axis as it holds the blank to operative position against the face of the rotating grindstone; and it will further be understood that, as the line of contact between grindstone and blank extends from the center to the periphery of the parabolic blank, the entire external surface of the blank A will in the operation of the machine come under the grinding action of the stone.

The portion of the machine which forms the subject of my present invention consists in a plate 15, preferably so mounted in the frame of the machine as to be immovable while the machine is in operation in its position with relation to the axis of rotation of the grindstone, but adjustable, so that its position with relation to the axis of rotation of the grindstone may be fixed at a predetermined point. To this end, as is particularly illustrated in Figs. 1 and 3, the plate 15 is supported upon the frame of the machine, indicated at 18, through the instrumentality of a slide consisting of the relatively movable parts 17 and 19. The part 17 is securely bolted to the frame of the machine 18 and upon the part 19 is securely mounted the plate 15, and the parts 17 and 19 are adjustable with relation to one another by means of a screw 20. These parts are so positioned with respect to the axis of rotation of the grindstone that the stone dressing-tool which is indirectly pivoted in plate 15 and which is hereinafter fully described will swing across the face of the grindstone in a plane radial to the axis of rotation of the grindstone, and as screw 20 is turned the stone-dressing tool will advance in such plane.

Upon the plate 15 is pivoted a lever-mechanism whose characteristic feature is that it includes two arms which are movable in coördination the one to the other, the range of movement of the two said arms being of predetermined relative magnitude. Such lever mechanism is exemplified in the double toggle lever of the drawings. This double toggle lever consists of the arms 1, 2, 3, and 4 united in a parallelogram and pivoted to the plate 15, as at 22. The toggle lever is preferably provided with protruding arms as particularly shown in Fig. 2, and constitutes such a mechanical member as finds practical use in lazy-tongs or in a pantograph. A templet 13 is rigidly mounted upon the plate 15 and two of the arms of the double-toggle lever, as 2 and 4, are extended beyond the pivot points. One of these arms 4 is adapted in any desired manner to move in a path determined by the contour of the said templet and the other of the two arms has a stone-dressing tool secured to it as by bolts 23. These parts are so proportioned and arranged that as the one arm follows the path predetermined by the contour of the templet, the other arm equipped with the stone dressing-tool will traverse the face of the grindstone and bring the tool into play upon the grindstone to bring it to its true shape. It will be observed that in the use of the lever mechanism shown the paths of movement of the two lever arms will be inverted in their disposition with respect to one another.

It will be understood that the portions of the double toggle lever may be so varied that a templet of any desired scale as related to the dimensions of the face of the grindstone may be employed, to facilitate operation. As is particularly illustrated in the drawings, the short arms and the long arms of this double-toggle lever are related to one another in the ratio of 2 to 1, and so the templet 13 has a contour face of just twice the dimensions of the face of the grindstone.

The means particularly shown in the drawings for causing the long lever arm 4 to follow a path determined by the contour of the templet 13 are a bearing-roller 12, carried by the lever arm, a spring 16 extended between the plate 15 and the long lever arm 4, and a handle 21. It will be understood that as the operator of the machine taking hold of the handle 21, causes the roller 12 to traverse the parabolic face of the templet 13, the stone dressing-tool 10 with which the prolonged lever arm 2 is equipped will traverse the working face of the grindstone 14.

It will be understood that as the grindstone wears away through use, it will be necessary by turning the set-screw 20 to cause the whole truing apparatus to advance radially toward the center of rotation of the grindstone and thus keep the truing device in a position to bear upon and bring to true shape the working parts of the grindstone 14. The stone dressing-tool 10 with which the prolonged lever arm is equipped is made longitudinally extensible by means of a set-screw, 11, working in a box 9, and it will be understood that the necessity for this feature of construction lies in the fact that the stone-truing tool 10 will itself be worn away in service, and that it is necessary to maintain the predetermined proportions in the length of the several lever parts, as otherwise (the dimensions of the templet 13 being fixed) the path through which the tool 10 travels would vary in the degree of its curvature. The direction in which the tool 10 is extensible is such with relation to the contour of the stone as to maintain the bearing of tool against stone upon the crown of the tool. As shown, the direction of extension is approximately perpendicular to the adjacent face of grindstone 14.

It is believed from the foregoing description the operation of this detail of machinery will be perfectly understood. It will be apparent, as was said at the outset, that, while as shown this mechanical device is useful for truing the faces of parabolic grindstone, it may be adapted without any change in idea to faces of stones of other configuration. It is by the use of my invention that it becomes possible to use a grindstone for shaping surfaces of unsymmetrical or irregular contour.

I claim herein as my invention:

1. In a truing device for a grinding machine, the combination with a grindstone, of a truing templet, and a double toggle lever, two arms of said lever being movable in coördination and in ranges of predetermined ratio, one of said arms being provided with a stone-dressing tool, and the movement of the other arm being controlled by said templet.

2. In a truing device for a grinding machine, the combination with a grindstone, of a templet, and a double toggle lever, one arm of said lever movable in a path determined by the contour of said templet and another arm of said lever armed with a stone-dressing instrument and movable across the face of said grindstone in response to movement of said first named lever arm in its said predetermined path, substantially as described.

3. In a truing device for a grinding machine, the combination with a grindstone, of a templet, means for adjusting the position of said templet with respect to the axis of said grindstone, and a double toggle lever, one arm of said lever movable in a path determined by the contour of said templet and another arm of said lever armed with a stone-dressing tool and movable across the face of said grindstone in response to movement of said first-named lever arm in its said predetermined path, substantially as described.

4. In a truing device for a grinding machine, the combination with a grindstone, of a templet, and a double toggle lever, one arm of said lever movable in a path determined by the contour of said templet and another arm of said lever armed with a longitudinally adjustable stone-dressing tool, substantially as described.

5. In a truing device for a grinding machine, the combination with a grindstone, of a templet, and a double toggle lever, one arm of said lever movable in a path determined by the contour of said templet and another arm of said lever armed with an extensible stone-dressing tool, the direction of extension being approximately perpendicular to the adjacent face of said grindstone, substantially as described.

6. In a truing device for a grinding machine, the combination of a grindstone having a parabolic peripheral grinding surface, a templet having a parabolic guiding surface substantially larger than an element of said grinding surface, and a double-toggle lever or pantograph pivoted at one point and having a stone dressing instrument secured to one arm thereof, said lever also carrying an abutment adapted to move over said guiding surface of said templet.

In testimony whereof I have hereunto set my hand.

CHAS. W. BEAM.

Witnesses:
LEMAN W. DOLBY,
HERBERT AILES.